United States Patent
Wang et al.

(10) Patent No.: US 10,242,610 B2
(45) Date of Patent: Mar. 26, 2019

(54) DETECTION SYSTEM FOR IMAGE STICKING OF DISPLAY PANEL AND METHOD THEREOF

(71) Applicant: Shenzhen China Star Optoelectronics Technology Co., Ltd., Shenzhen, Guangdong (CN)

(72) Inventors: Yanxue Wang, Guangdong (CN); Lixuan Chen, Guangdong (CN); Jing Zhang, Guangdong (CN); Yun Zhang, Guangdong (CN); Yansong Li, Guangdong (CN)

(73) Assignee: Shenzhen China Star Optoelectronics Technology Co., Ltd, Shenzhen (CN)

( * ) Notice: Subject to any disclaimer, the term of this patent is extended or adjusted under 35 U.S.C. 154(b) by 241 days.

(21) Appl. No.: 15/123,680

(22) PCT Filed: Jul. 20, 2016

(86) PCT No.: PCT/CN2016/090655
§ 371 (c)(1),
(2) Date: Sep. 6, 2016

(87) PCT Pub. No.: WO2018/006443
PCT Pub. Date: Jan. 11, 2018

(65) Prior Publication Data
US 2018/0204491 A1 Jul. 19, 2018

(30) Foreign Application Priority Data
Jul. 8, 2016 (CN) .......................... 2016 1 05397469

(51) Int. Cl.
*H04N 17/00* (2006.01)
*G09G 3/00* (2006.01)
(Continued)

(52) U.S. Cl.
CPC ............. *G09G 3/006* (2013.01); *G06F 17/14* (2013.01); *G06T 7/0002* (2013.01); *G09G 2320/02* (2013.01); *H04N 17/00* (2013.01)

(58) Field of Classification Search
CPC .... G09G 3/006; G09G 2320/02; G06F 17/14; G06T 7/0002; H04N 1/00002
(Continued)

(56) References Cited

U.S. PATENT DOCUMENTS 8,958,639 B2    2/2015  Chen et al.
9,972,281 B2 *  5/2018  Park .......................... G09G 5/18
(Continued)

FOREIGN PATENT DOCUMENTS

CN    101425246 A    5/2009
CN    101762921 A    6/2010
(Continued)

*Primary Examiner* — Michael Lee
(74) *Attorney, Agent, or Firm* — Andrew C. Cheng (57) ABSTRACT

The present application discloses a detection system for image sticking of display panel and method thereof, includes obtaining the display panel image to be detecting the image sticking; obtaining the image display portion of the display panel in the display panel image; performing Fourier transform to the image display portion, obtaining a first spectral energy value with characteristic frequency corresponding to the image sticking in the image display portion, and a second spectral energy value of the reference frequency in the image display portion; determining the ratio of the first spectral energy value and the second spectral energy value is exceeding the numerical range of the corresponded qualified detection, if beyond, it is judged as disqualified. By the method described above, the present application can solve the conventional image sticking judgment based on human subjectivity, accurate judgment and objectively evaluation of severity the image sticking of the display panel.

12 Claims, 4 Drawing Sheets

(51) Int. Cl.
   *G06F 17/14*     (2006.01)
   *G06T 7/00*      (2017.01)
(58) Field of Classification Search
   USPC .......................................................... 348/180
   See application file for complete search history.

(56) References Cited

U.S. PATENT DOCUMENTS

2009/0096778  A1*   4/2009   Su .......................... G09G 3/006
                                                         345/214
2010/0103198  A1*   4/2010   Polak ....................... G09G 3/30
                                                         345/690
2017/0214911  A1*   7/2017   Wang .................... H04N 17/004

FOREIGN PATENT DOCUMENTS

| | | |
|---|---|---|
| CN | 105427776 X | 3/2016 |
| JP | 09-101816 A | 4/1997 |
| KR | 1020080107779 A | 12/2008 |

* cited by examiner

DETECTION SYSTEM FOR IMAGE STICKING OF DISPLAY PANEL AND METHOD THEREOF

FIELD OF THE INVENTION

The present application relates to a display technology field, and more particularly to a detection system for image sticking of display panel and the method thereof.

BACKGROUND OF THE INVENTION

Figure 1:
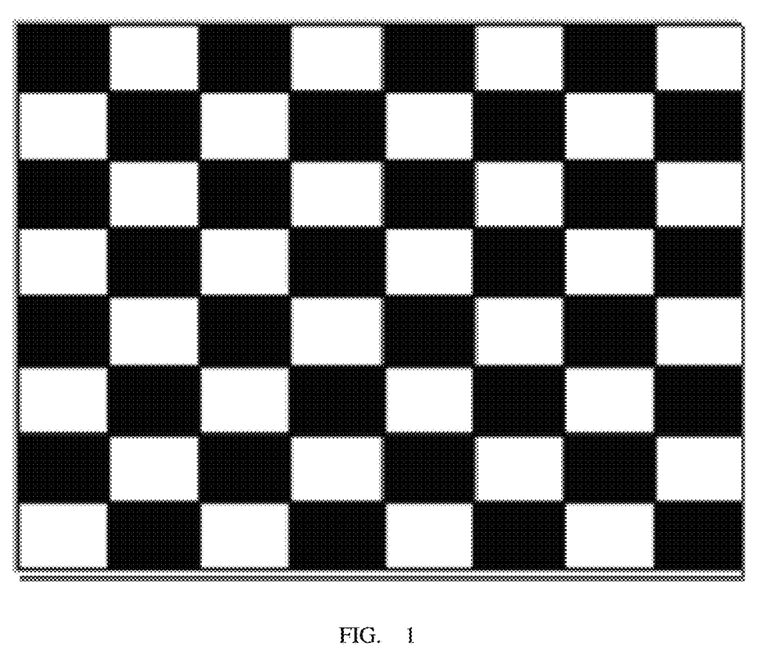
FIG. 1 illustrates a black and white checkerboard pattern image for display the image sticking detection.

In the panel design process, performing the detection and judgement for the image sticking is essential parts, that is put panel to lights up at the checkerboard image as shown in FIG. 1 for 168-169 hours, then observing the severity level of the gray scale image sticking of the checkerboard pattern image under one gray scale. The generally judgement reference is based on the just noticeable difference of human eye judgment; the results of the judgment have some subjective factors.

SUMMARY OF THE INVENTION

The technology problem to be solved in the present application is to provide a detection system for image sticking of display panel and method thereof to solve the conventional image sticking judgment based on human subjectivity, accurate judgment and objectively evaluation of severity the image sticking of the display panel.

In order to solve the problem mentioned above, the technology approach adapted in the present application is to provide a method for detecting the image sticking of display panel, including: obtaining the display panel image to be detecting the image sticking, wherein the display panel image is under 128-grayscale after the IS experiment; identify the position of the display panel of the display panel image, and further obtaining the image display portion of the display panel in the display panel image; performing Fourier transform to the image display portion, obtaining a first spectral energy value with characteristic frequency in the frequency domain structure corresponding to the image sticking in the image display portion, in addition a second spectral energy value in the frequency domain structure corresponding to the reference frequency in the image display portion; and determining the ratio of the first spectral energy value and the second spectral energy value is exceeding the numerical range of the corresponded qualified detection, if the value beyond the numerical range, it is judged as disqualified, otherwise is qualified.

Wherein the step of identify the position of the display panel of the display panel image, therefore obtaining the image display portion of the display panel in the display panel image including: by using the same method and conditions of obtaining the display panel image to be detecting the image sticking to obtain a reference frame image corresponding to the size of the display panel; by the contrast of the reference frame image and the display panel image, to identify the position of the display panel in the display panel image, and further obtaining the image display portion of the display panel from the display panel image.

Wherein the same condition including the same image obtaining devices, the same image obtaining parameters, the same shooting position and the same shooting environment.

Wherein the reference frequency is zero frequency.

Wherein the step of identify the position of the display panel in the display panel image, and further obtaining the image display portion of the display panel from the display panel image including: identify the position of the display panel in the display panel image, using image clipping algorithm to obtain the image display portion of the display panel from the display panel image.

In order to solve the problem mentioned above, the other technology approach adapted in the present application is to provide a method for detecting the image sticking of display panel, including: obtaining the display panel image to be detecting the image sticking; identify the position of the display panel of the display panel image, and further obtaining the image display portion of the display panel in the display panel image; performing Fourier transform to the image display portion, obtaining a first spectral energy value with characteristic frequency in the frequency domain structure corresponding to the image sticking in the image display portion, in addition a second spectral energy value in the frequency domain structure corresponding to the reference frequency in the image display portion; and determining the ratio of the first spectral energy value and the second spectral energy value is exceeding the numerical range of the corresponded qualified detection, if the value beyond the numerical range, it is judged as disqualified, otherwise is qualified. Wherein the step of identify the position of the display panel of the display panel image, therefore obtaining the image display portion of the display panel in the display panel image including: by using the same method and conditions of obtaining the display panel image to be detecting the image sticking to obtain a reference frame image corresponding to the size of the display panel; by the contrast of the reference frame image and the display panel image, to identify the position of the display panel in the display panel image, and further obtaining the image display portion of the display panel from the display panel image.

Wherein the same condition including the same image obtaining devices, the same image obtaining parameters, the same shooting position and the same shooting environment.

Wherein the reference frequency is zero frequency.

Wherein the step of identify the position of the display panel in the display panel image, and further obtaining the image display portion of the display panel from the display panel image including: identify the position of the display panel in the display panel image, using image clipping algorithm to obtain the image display portion of the display panel from the display panel image.

In order to solve the problem mentioned above, the other technology approach adapted in the present application is to provide a detection system for image sticking of display panel, including: an acquisition unit for obtaining the display panel image to be detected the image sticking; an extraction unit for identifying the position of the display panel of the display panel image, and further obtaining the image display portion of the display panel in the display panel image; a calculation unit for performing Fourier transform to the image display portion, obtaining a first spectral energy value with characteristic frequency in the frequency domain structure corresponding to the image sticking in the image display portion, in addition a second spectral energy value in the frequency domain structure corresponding to the reference frequency in the image display portion; and a judgment unit for determining the ratio of the first spectral energy value and the second spectral energy value is exceeding the numerical range of the corresponded qualified detection, if the value beyond the numerical range, it is judged as disqualified, otherwise is qualified.

Wherein the extraction unit including: an acquisition module for using the same method and conditions of obtaining the display panel image to be detecting the image sticking to obtain a reference frame image corresponding to the size of the display panel; and an extraction module for comparing the contrast of the reference frame image and the display panel image, to identify the position of the display panel in the display panel image, and further obtaining the image display portion of the display panel from the display panel image.

Wherein the same condition including the same image obtaining devices, the same image obtaining parameters, the same shooting position and the same shooting environment.

Wherein the reference frequency is zero frequency.

Wherein the extraction module is specifically identify the position of the display panel in the display panel image, using image clipping algorithm to obtain the image display portion of the display panel from the display panel image.

The advantage of the present application is: comparing to the conventional technology, the present application provides a detection system for image sticking of display panel and method thereof, the method includes the following steps: obtaining the display panel image to be detecting the image sticking; identify the position of the display panel of the display panel image, and further obtaining the image display portion of the display panel in the display panel image; performing Fourier transform to the image display portion, obtaining a first spectral energy value with characteristic frequency in the frequency domain structure corresponding to the image sticking in the image display portion, in addition a second spectral energy value in the frequency domain structure corresponding to the reference frequency in the image display portion; and determining the ratio of the first spectral energy value and the second spectral energy value is exceeding the numerical range of the corresponded qualified detection, if the value beyond the numerical range, it is judged as disqualified, otherwise is qualified. Therefore, the present application performs the image processing of frequency-domain structure to the obtained image display portion to solve the conventional image sticking judgment based on human subjectivity, accurate judgment and objectively evaluation of severity the image sticking of the display panel.

BRIEF DESCRIPTION OF THE DRAWINGS

In order to more clearly illustrate the embodiments of the present application or prior art, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts obtained should be considered within the scope of protection of the present application.

Specifically, the terminologies in the embodiments of the present application are merely for describing the purpose of the certain embodiment, but not to limit the invention. Examples and the claims be implemented in the present application requires the use of the singular form of the book "an", "the" and "the" are intend to include most forms unless the context clearly dictates otherwise. It should also be understood that the terminology used herein that "and/or" means and includes any or all possible combinations of one or more of the associated listed items.

Figure 2:
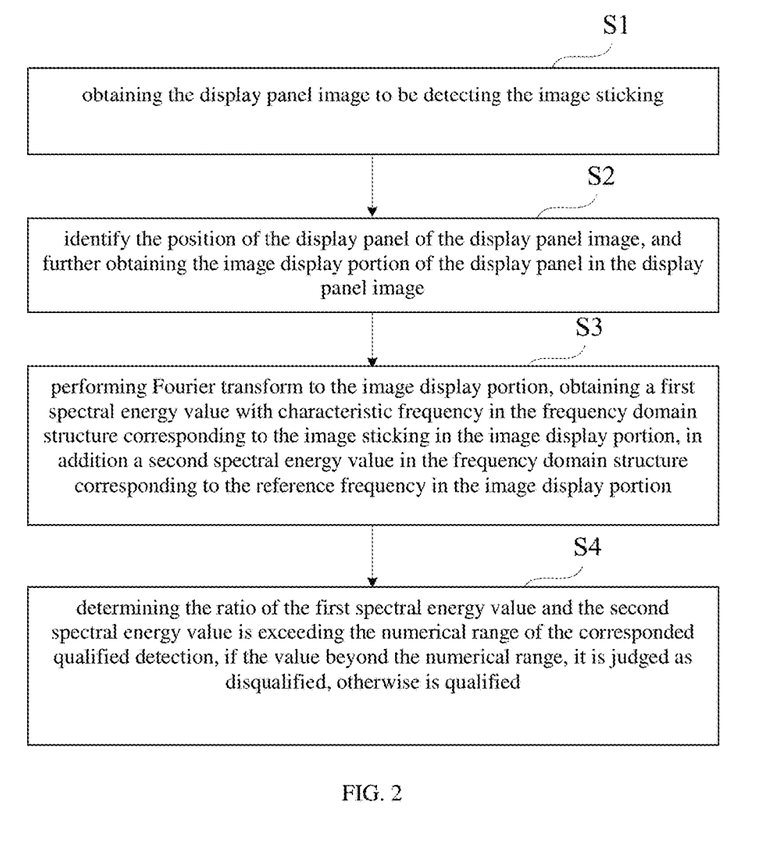
FIG. 2 illustrates a flow of a method for detecting the image sticking of display panel according to an embodiment of the present application.
Figure 3:
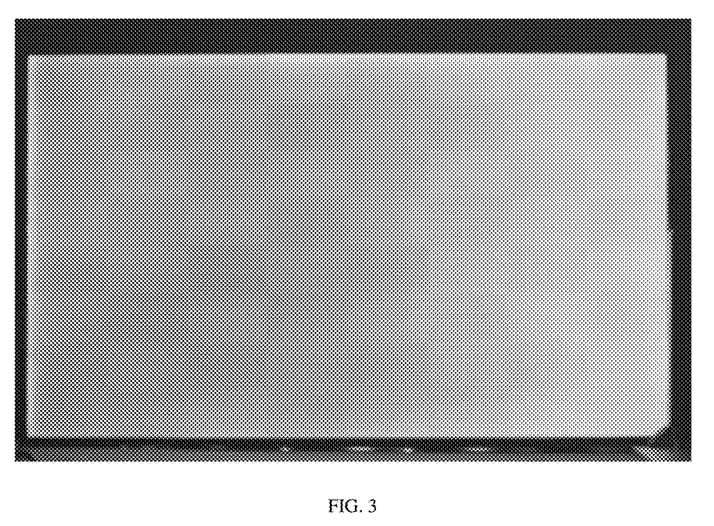
FIG. 3 illustrates an display panel image to be detecting the image sticking under 128-grayscale after the IS experiment.

Referring to FIG. 2, FIG. 2 illustrates a flow of a method for detecting the image sticking of display panel according to an embodiment of the present application. As illustrated in FIG. 2, the method for detecting the image sticking of display panel according to present embodiment including the following steps:

Step S1: obtaining the display panel image to be detecting the image sticking. The specific is to obtain the display panel image to be detecting the image sticking under 128-grayscale after the IS experiment, as illustrated in FIG. 3.

Step S2: identify the position of the display panel of the display panel image, therefore obtaining the image display portion of the display panel in the display panel image.

Figure 4:
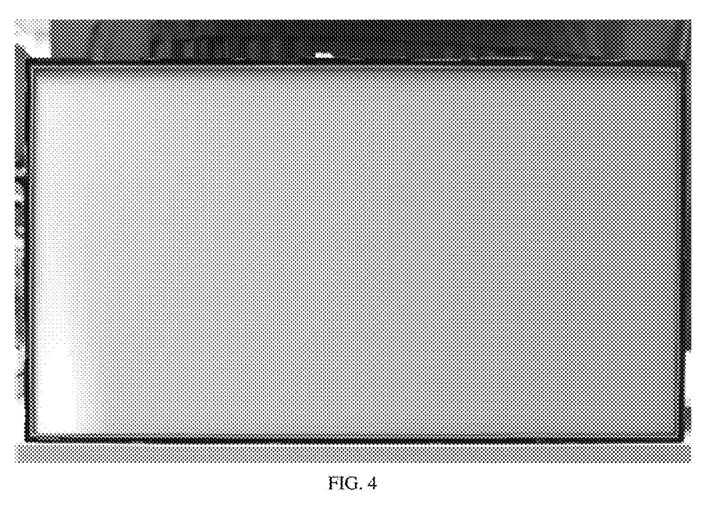
FIG. 4 illustrates a reference frame image corresponding to the size of the display panel.
Figure 5:
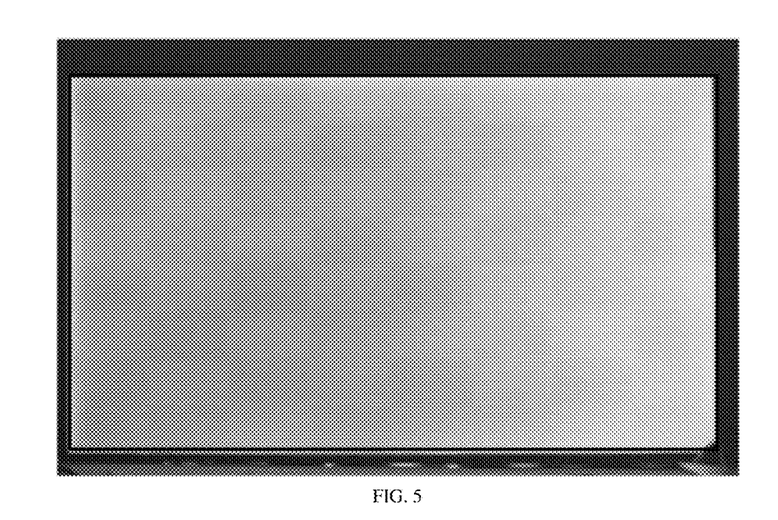
FIG. 5 illustrates an image display portion of the display panel from the display panel image.

In this step, first, the reference frame image corresponding to the size of the display panel is obtained by using the same method and conditions of obtaining the display panel image to be detecting the image sticking in step S1, the specifically is illustrated in FIG. 4. And then by the contrast of the reference frame image and the display panel image, to identify the position of the display panel in the display panel image, and further obtaining the image display portion of the display panel from the display panel image, as illustrated in FIG. 5. More specifically, identify the position of the display panel in the display panel image, using image clipping algorithm to obtain the image display portion of the display panel from the display panel image, as illustrated in FIG. 5.

In the present embodiment, the image cropping algorithm is preferably a matlab (Matrix Laboratory) image clipping algorithm. In other embodiments, the image clipping algorithm using other languages and applications can also be used to obtain the image display portion of the display panel from the display panel image.

Wherein, the same condition means the same image obtaining devices, the same image obtaining parameters, the same shooting position and the same shooting environment. The preferred same conditions selected in the present embodiment is as followed:

Camera, camera item model: Canon600D. Camera parameters: ISO100; Color Space sRGB; Flash light Off; Auto Brightness closed; White balance shift and bracketing:

0, 0/±0; red-eye reduction on/off: Disable; autofcous mode: real time mode; showing gridlines: disabled; Aspect ratio: 3:2; metering timer: 16 seconds; bass boost: disabled; via HDMI control: disable.

Further, the shooting distance is three times the width of the display panel, shooting direction is perpendicular to the plane of the display panel, the shooting environment is darkroom.

Step S3: performing Fourier transform to the image display portion, obtaining a first spectral energy value with characteristic frequency in the frequency domain structure corresponding to the image sticking in the image display portion, in addition a second spectral energy value in the frequency domain structure corresponding to the reference frequency in the image display portion. Wherein the reference frequency is zero frequency, the second spectral energy value is the energy spectrum value corresponding to the intensity of the background of the display panel image.

Step S4: determining the ratio of the first spectral energy value and the second spectral energy value is exceeding the numerical range of the corresponded qualified detection, if the value beyond the numerical range, it is judged as disqualified, otherwise is qualified. At the time of disqualified, if the ratio is larger, it means the worse image sticking of the display panel.

Wherein the ratio of the first spectral energy value and the second spectral energy value can be combined with traditional JND model for determining a critical evaluation value generated by the image sticking of the display panel that is corresponding to the numerical range of the qualified detection. Preferably, when the JND values is just between invisible and 1.8, the ratio of the first spectral energy value and the second spectral energy value is the threshold to determine whether the image sticking occur or not.

Continuing to the description above, twice standard shooting is performing in the present embodiment, one is for obtaining an display panel image to be detected the image sticking, one is for obtaining an reference frame image corresponding to the size of the display panel, comparing the two images, to obtain the position of the image display portion of the display panel in the display panel image. Further, performing the image processing to image display portion of the display panel in the frequency domain structure, to obtain the energy value of the characteristic frequency in the IS frequency spectrum, and obtain the ratio to the energy value of the zero frequency, thereby improving the objectivity of the judgment of the image sticking of the display panel.

Figure 6:
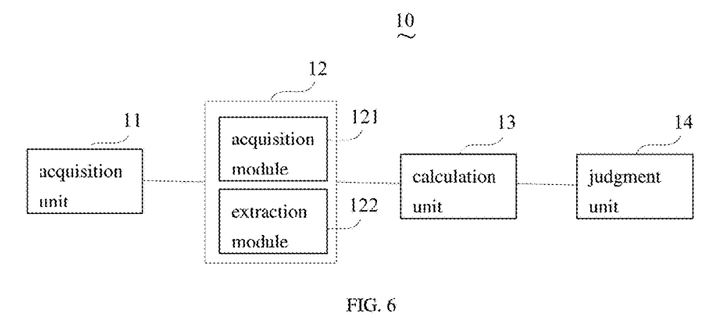
FIG. 6 is a schematic structural view of a detection system for image sticking of the display panel according to an embodiment of the present application.

The embodiment of present application also provides a detection system for image sticking of display panel, the system is applied to the previously described method. Referring to FIG. 6 for detail description.

The detection system for image sticking of display panel 10 in the present embodiment includes an acquisition unit 11, an extraction unit 12, a calculation unit 13 and a judgment unit 14.

Wherein the acquisition unit 11 is for obtaining the display panel image to be detected the image sticking. The specific is to obtain the display panel image to be detecting the image sticking under 128-grayscale after the IS experiment, as illustrated in FIG. 3. The acquisition unit 11 is preferably a camera or other devices to obtain image.

The extraction unit 12 for identifying the position of the display panel of the display panel image, therefore obtaining the image display portion of the display panel in the display panel image. Wherein the extraction unit 12 further includes an acquisition module 121 and an extraction module 122.

The same condition is adapted to the acquisition module 121 as the method used by the acquisition unit 11 to obtain the display panel image to be detecting the image sticking to obtain the reference frame image corresponding to the size of the display panel, the specifically is illustrated in FIG. 4. Wherein the same condition means that the same image acquisition devices, the same image acquisition parameters, the same shooting position and the same shooting environments. That is the acquisition module 121 and the acquisition unit 11 adapt the same image acquisition device. The preferred the same conditions selected in the present embodiment is as followed: Camera, camera item model: Canon600D. Camera parameters: ISO100; Color Space sRGB; Flash light Off; Auto Brightness closed; White balance shift and bracketing: 0, 0/±0; red-eye reduction on/off: Disable; autofcous mode: real time mode; showing gridlines: disabled; Aspect ratio: 3:2; metering timer: 16 seconds; bass boost: disabled; via HDMI control: disable.

Further, the shooting distance is three times the width of the display panel, shooting direction is perpendicular to the plane of the display panel, the shooting environment is darkroom.

The extraction module 122 is by comparing the contract of the reference frame image and the display panel image to identify the position of the display panel in the display panel image, and further obtaining the image display portion of the display panel from the display panel image, specifically, the extraction module 122 identify the position of the display panel in the display panel image, using image clipping algorithm to obtain the image display portion of the display panel from the display panel image, as illustrated in FIG. 5.

In the present embodiment, the image cropping algorithm is preferably a matlab (Matrix Laboratory) image clipping algorithm. In other embodiments, the image clipping algorithm using other languages and applications can also be used to obtain the image display portion of the display panel from the display panel image.

The calculation unit 13 is for performing Fourier transform to the image display portion, obtaining a first spectral energy value with characteristic frequency in the frequency domain structure corresponding to the image sticking in the image display portion, in addition a second spectral energy value in the frequency domain structure corresponding to the reference frequency in the image display portion. Wherein the reference frequency is zero frequency, the second spectral energy value is the energy spectrum value corresponding to the intensity of the background of the display panel image.

The judgment unit 14 is for determining the ratio of the first spectral energy value and the second spectral energy value is exceeding the numerical range of the corresponded qualified detection, if the value beyond the numerical range, it is judged as disqualified, otherwise is qualified. At the time of disqualified, if the ratio is larger, it means the worse image sticking of the display panel.

Wherein the ratio of the first spectral energy value and the second spectral energy value can be combined with traditional JND model for determining a critical evaluation value generated by the image sticking of the display panel that is corresponding to the numerical range of the qualified detection. Preferably, when the JND values is just between invisible and 1.8, the ratio of the first spectral energy value and the second spectral energy value is the threshold to determine whether the image sticking occur or not.

In summary, the present embodiment combines the images obtained by shooting and the image processing method of frequency-domain structure to detect the image sticking of the display panel, to solve the conventional image sticking judgment based on human subjectivity, accurate judgment and objectively evaluation of severity the image sticking of the display panel.

The present application is focus on the IS experiments need to perform by the panel marker, it can be used in the real-time quantitative detection and evaluation of the image sticking of the display panel, during the process of the IS experiment, and the quantitative detection and evaluation of the image sticking of the display panel after IS to reduce labor and time costs of IS judgment and reduce subjective influence of human eye judgments.

Above are embodiments of the present application, which does not limit the scope of the present application. Any modifications, equivalent replacements or improvements within the spirit and principles of the embodiment described above should be covered by the protected scope of the invention.

What is claimed is:

1. A method for detecting an image sticking of display panel, comprising:
    obtaining a display panel image to be detecting the image sticking, wherein the display panel image is under 128-grayscale after an IS experiment;
    identify a position of the display panel of the display panel image, and further obtaining an image display portion of the display panel in the display panel image;
    performing Fourier transform to the image display portion, obtaining a first spectral energy value with characteristic frequency in the frequency domain structure corresponding to the image sticking in the image display portion, in addition a second spectral energy value in the frequency domain structure corresponding to a reference frequency in the image display portion; and
    determining a ratio of the first spectral energy value and the second spectral energy value is exceeding a numerical range of a corresponded qualified detection, if the value beyond the numerical range, it is judged as disqualified, otherwise is qualified;
    wherein the step of identify the position of the display panel of the display panel image, therefore obtaining the image display portion of the display panel in the display panel image comprising:
    by using a same method and conditions of obtaining the display panel image to be detecting the image sticking to obtain a reference frame image corresponding to the size of the display panel;
    by the contrast of the reference frame image and the display panel image, to identify the position of the display panel in the display panel image, and further obtaining the image display portion of the display panel from the display panel image.

2. The method according to claim 1, wherein the same condition comprising a same image obtaining devices, a same image obtaining parameters, a same shooting position and a same shooting environment.

3. The method according to claim 1, wherein the reference frequency is zero frequency.

4. The method according to claim 1, wherein the step of identify the position of the display panel in the display panel image, and further obtaining the image display portion of the display panel from the display panel image comprising:
    identify the position of the display panel in the display panel image, using image clipping algorithm to obtain the image display portion of the display panel from the display panel image.

5. A method for detecting an image sticking of display panel, comprising:
    obtaining a display panel image to be detecting the image sticking;
    identify a position of the display panel of the display panel image, and further obtaining an image display portion of the display panel in the display panel image;
    performing Fourier transform to the image display portion, obtaining a first spectral energy value with characteristic frequency in the frequency domain structure corresponding to the image sticking in the image display portion, in addition a second spectral energy value in the frequency domain structure corresponding to a reference frequency in the image display portion; and
    determining a ratio of the first spectral energy value and the second spectral energy value is exceeding a numerical range of a corresponded qualified detection, if the value beyond the numerical range, it is judged as disqualified, otherwise is qualified;
    wherein the step of identify the position of the display panel of the display panel image, therefore obtaining the image display portion of the display panel in the display panel image comprising:
    by using a same method and conditions of obtaining the display panel image to be detecting the image sticking to obtain a reference frame image corresponding to the size of the display panel;
    by the contrast of the reference frame image and the display panel image, to identify the position of the display panel in the display panel image, and further obtaining the image display portion of the display panel from the display panel image.

6. The method according to claim 5, wherein the same condition comprising a same image obtaining devices, a same image obtaining parameters, a same shooting position and a same shooting environment.

7. The method according to claim 5, wherein the reference frequency is zero frequency.

8. The method according to claim 5, wherein the step of identify the position of the display panel in the display panel image, and further obtaining the image display portion of the display panel from the display panel image comprising:
    identify the position of the display panel in the display panel image, using image clipping algorithm to obtain the image display portion of the display panel from the display panel image.

9. A detection system for image sticking of display panel, comprising:
    an acquisition unit for obtaining a display panel image to be detected the image sticking;
    an extraction unit for identifying a position of the display panel of the display panel image, and further obtaining an image display portion of the display panel in the display panel image;
    a calculation unit for performing Fourier transform to the image display portion, obtaining a first spectral energy value with characteristic frequency in the frequency domain structure corresponding to the image sticking in the image display portion, in addition a second spectral energy value in the frequency domain structure corresponding to a reference frequency in the image display portion; and
    a judgment unit for determining a ratio of the first spectral energy value and the second spectral energy value is exceeding a numerical range of a corresponded qualified detection, if the value beyond the numerical range, it is judged as disqualified, otherwise is qualified;

wherein the extraction unit comprising:
an acquisition module for using a same method and conditions of obtaining the display panel image to be detecting the image sticking to obtain a reference frame image corresponding to the size of the display panel; and an extraction module for comparing the contrast of the reference frame image and the display panel image, to identify the position of the display panel in the display panel image, and further obtaining the image display portion of the display panel from the display panel image.

10. The system according to claim 9, wherein the same condition comprising a same image obtaining devices, a same image obtaining parameters, a same shooting position and a same shooting environment.

11. The system according to claim 9, wherein the reference frequency is zero frequency.

12. The system according to claim 9, wherein the extraction module is specifically identify the position of the display panel in the display panel image, using image clipping algorithm to obtain the image display portion of the display panel from the display panel image.

* * * * *